(12) United States Patent
Han et al.

(10) Patent No.: US 7,903,877 B2
(45) Date of Patent: Mar. 8, 2011

(54) RADICAL-BASED HMM MODELING FOR HANDWRITTEN EAST ASIAN CHARACTERS

(75) Inventors: Shi Han, Beijing (CN); Yu Zou, Beijing (CN); Ming Chang, Beijing (CN); Peng Liu, Beijing (CN); Yi-Jian Wu, Beijing (CN); Lei Ma, Beijing (CN); Frank Soong, Beijing (CN); Dongmei Zhang, Bellevue, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 997 days.

(21) Appl. No.: 11/682,722

(22) Filed: Mar. 6, 2007

(65) Prior Publication Data

US 2008/0219556 A1 Sep. 11, 2008

(51) Int. Cl.
*G06K 9/00* (2006.01)
*G06K 9/18* (2006.01)
(52) U.S. Cl. .......................................... 382/181; 382/185
(58) Field of Classification Search .................. 382/181, 382/185–187, 159, 228; 704/256
See application file for complete search history.

(56) References Cited

U.S. PATENT DOCUMENTS

| | | | |
|---|---|---|---|
| 5,459,809 A | 10/1995 | Kim et al. | |
| 5,559,897 A | 9/1996 | Brown et al. | |
| 5,636,291 A | 6/1997 | Bellegarda et al. | |
| 5,768,423 A | 6/1998 | Aref et al. | |
| 5,923,778 A * | 7/1999 | Chen et al. | 382/185 |
| 6,389,166 B1 | 5/2002 | Chang et al. | |
| 6,417,846 B1 | 7/2002 | Lee | |
| 6,453,054 B1 | 9/2002 | Caesar et al. | |
| 6,556,712 B1 | 4/2003 | Loudon et al. | |
| 6,940,617 B2 | 9/2005 | Ma et al. | |
| 6,956,969 B2 | 10/2005 | Loudon et al. | |
| 2006/0269146 A1 | 11/2006 | Eisenhart et al. | |

FOREIGN PATENT DOCUMENTS

| | | |
|---|---|---|
| JP | 2008096081 | 4/2008 |
| JP | 2008161426 | 7/2008 |

OTHER PUBLICATIONS

Bellegarda, et al., "A discrete parameter hmm approach to on-line handwriting recognition", available at least as early as Jan. 31, 2007, at <<http://ieeexplore.ieee.org/iel5/3469/10218/00480101.pdf?isNumber=>>, IEEE, 1995, pp. 2631-2634.

(Continued)

*Primary Examiner* — Daniel G Mariam
(74) *Attorney, Agent, or Firm* — Lee & Hayes, PLLC

(57) ABSTRACT

Exemplary methods, systems, and computer-readable media for developing, training and/or using models for online handwriting recognition of characters are described. An exemplary method for building a trainable radical-based HMM for use in character recognition includes defining radical nodes, where a radical node represents a structural element of an character, and defining connection nodes, where a connection node represents a spatial relationship between two or more radicals. Such a method may include determining a number of paths in the radical-based HMM using subsequence direction histogram vector (SDHV) clustering and determining a number of states in the radical-based HMM using curvature scale space-based (CSS) corner detection.

15 Claims, 9 Drawing Sheets

OTHER PUBLICATIONS

Bojovic, et al., "Training of Hidden Markov Models for Cursive Handwritten Word Recognition", available at least as early as Jan. 31, 2007, at <<http://ieeexplore.ieee.org/iel5/7237/19577/00905624.pdf?isNumber=>>, IEEE, 2000, pp. 973-976.

Kundu, et al., "Recognition of Handwritten Script: A Hidden Markov Model Approach", available at least as early as Jan. 31, 2007, at <<http://ieeexplore.ieee.org/iel2/723/5035/00196741.pdf?isNumber=>>, IEEE, 1988, pp. 928-931.

Sanguansat, et al., "Online Thai handwritten character recognition using hidden markov Models and support vector machines", available at least as early as Jan. 31, 2007, at <<http://ieeexplore.ieee.org/iel5/9699/30608/01412894.pdf?tp=&arnumber=1412894&isnumber=30608>>, ISCIT, 2004, pp. 492-497.

Tsai, et al., "Online recognition of chinese handwriting using a hierarchical fuzzy clustering approach", available at least as early as Jan. 31, 2007, at <<http://ieeexplore.ieee.org/iel5/9711/30654/01416342.pdf?tp=&arnumber=1416342&isnumber=30654>>, IEEE, 2005, pp. 469-474.

\* cited by examiner

EXEMPLARY STATE SEQUENCES
INCLUDING DURATIVE AND TURNING STATES 800

US 7,903,877 B2

RADICAL-BASED HMM MODELING FOR HANDWRITTEN EAST ASIAN CHARACTERS

RELATED APPLICATIONS

The present application is related to (a) commonly assigned U.S. patent application Ser. No. 11/680,566, entitled, "Radical Set Determination For HMM Based East Asian Character Recognition", to Han et al., filed on Feb. 28, 2007, issued as U.S. Pat. No. 7,805,004; and (b) to commonly assigned co-pending P.R.C. Patent Application Serial Number 200710085282.X, entitled, "Method and Apparatus for Constructing HMM Models for Recognizing online Eastern Asian Characters", to Han et al., filed in the State Intellectual Property Office of the P.R.C. on Feb. 28, 2007, (and USMC-1093.070558), which are incorporated by reference herein for all that they teach and disclose.

BACKGROUND

An East Asian (EA) written language (e.g., Chinese, Japanese, Korean, or the like) is very complex having thousands of characters. For example, the Chinese written language may include over 20,000 to 50,000 single characters and 10,000 commonly used characters.

This huge and complex character set makes entry of characters, by a typical keyboard into computers or electronic devices very slow and cumbersome. While the entry of East Asian characters is difficult on character-set keyboards, the problem is exacerbated when moving to handheld devices that are commonly equipped with input mechanisms with fewer keys. For instance, a personal digital assistant commonly uses only eight keys to enter information. As a result, attempting to enter 10,000-20,000 Chinese characters with a few keys on the personal digital assistant, can be very time consuming and awkward.

A practical way to enter characters into a computing system is by using a stylus or an electronic pen in conjunction with a tablet-based personal computing device. This method of entry is known as online handwriting recognition. Accordingly, this method may be used to enter East Asian characters, but may face problems during the process.

With online handwriting recognition, problems arise such as lack of speed, accuracy, different writing styles, and different writing orders in recognizing on-line East Asian handwriting. Hidden Markov models (HMMs) have been applied towards online handwriting recognition. HMMs may automatically extract knowledge from training patterns and have the capability of modeling temporal information. By using the intrinsic properties of HMMs for online handwriting recognition, the underlining structure of EA characters may be modeled and sequential information can be modeled according to time. For example, online handwriting recognition is a mainstream of time sequential data for input to computers. Therefore, HMMs can model variability and temporal information of East Asian character handwriting data.

SUMMARY

Various exemplary methods, computer program products, and systems for development, training and use of HMMs for online handwriting recognition of East Asian characters are described herein. An exemplary method determines a representation for each East Asian character using radicals and connections. Such a representation of the EA characters defines what particular radicals and connections are used to construct any particular EA character.

In one aspect, this disclosure describes a representation for each East Asian character using radicals and connections to model East Asian characters using a radical-based HMM modeling approach. An exemplary radical-based HMM has a multi-path topology developed according to one or more algorithms for path and/or state determinations. For a given East Asian character, a radical-based HMM includes concatenated radical HMMs and connection HMMs. After appropriate training, a radical-based HMM can provide for online handwritten East Asian characters.

In another aspect, a system for recognizing online handwriting of East Asian characters includes an input, a processor, a memory, and an output. The input is operable to receive ink data for whole East Asian characters, the memory stores processing system instructions, the processor analyzes the ink data for online handwriting recognition, and the output may display recognized East Asian characters or take other appropriate action. While this aforementioned system pertains to use of a radical-based HMM, an exemplary system may include various features for development of a radical-based HMM, for example, by implementing various exemplary algorithms described herein (e.g., convergence measure algorithms, SDHV clustering algorithms, CSS algorithms, etc.). Such techniques can aid in development (including refinement) and training of a radical-based HMM.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

More efficient character recognition systems can be useful for a variety of applications, especially for recognition of East Asian (EA) characters (e.g., Chinese, Japanese, Korean, or the like). Exemplary approaches to enhance efficiency of character recognition are described herein, and include modeling East Asian characters using a radical-based HMM and training a radical-based HMM with training data.

As described herein, an exemplary character recognition system can use an algorithm to determine an optimal radical set that can represent a set of EA characters.

As described herein, modeling East Asian characters includes determining a representation for each East Asian character using radicals and connections. Radicals and connections can be used in a HMM topology design algorithm to better model online handwriting recognition of East Asian characters. As described in more detail below, an East Asian character's HMM can be formed from concatenated radical HMMs and connection HMMs. More specifically, an exemplary HMM can include radical nodes and connection nodes where the connection nodes pertain to relationships between two or more radicals. Hence, visible lines of a character can be represented by radical nodes and the relationships between lines can be represented by connection nodes.

The training of an exemplary radical-based HMM includes providing an initial HMM and using the initial HMM to automatically split the ink data of East Asian characters into ink data for radicals and ink data for connections. Given radical ink data and connection ink data, training can train radical HMMs using ink data of the radicals and train connection HMMs using ink data of the connections. Once trained radical HMMs and trained connection HMM are generated, a training method can collect the radical HMMs and the connection HMMs together to build a radical-based HMM. Additional training of the resulting radical-based HMM can occur by using the radical-based HMM to split ink data of the East Asian characters, and iteratively refine the radical-based HMM.

In another aspect, an exemplary radical-based HMM may model each radical and each connection by a sequence of durable states and turning states. Turning states are used to model variability of turnings, while the durative states are used to model variability of sub-strokes.

Strokes and Order of Strokes of EA Characters

Figure 1:
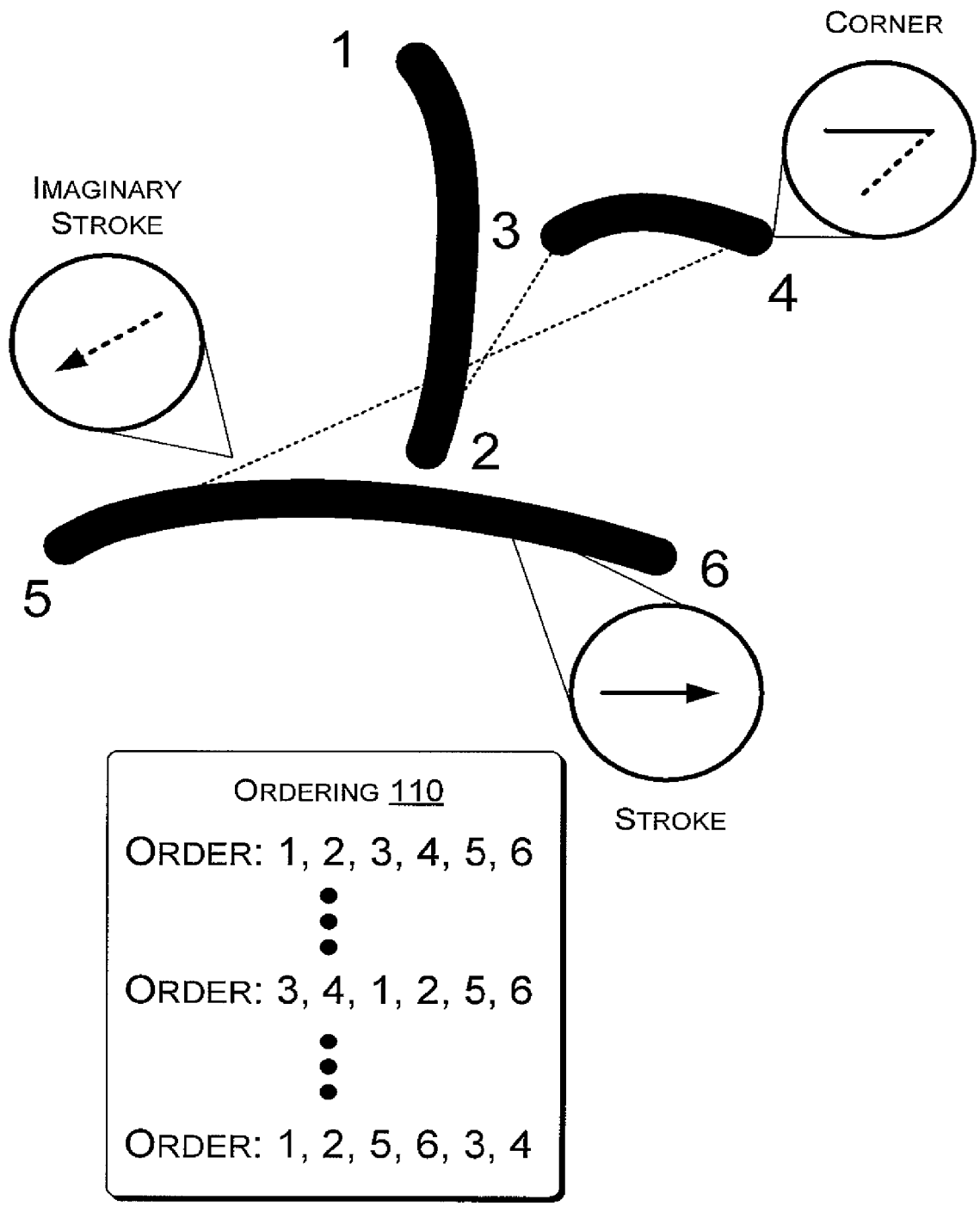
FIG. 1 is a diagram of an East Asian (EA) character with indications of strokes and order of strokes, according to one embodiment.

FIG. 1 shows a diagram of an East Asian (EA) character with indications of strokes 100 and order of strokes 110. Various end points of individual strokes are labeled from 1 to 6. In drawing the character, a person may form a corner or make an imaginary stroke. The simplest basic element set for an EA character is the set of strokes since all EA characters consist of strokes. However, strokes are typically too simple to form stable recognition models for EA characters.

Another type of element is referred to as a radical, which is a stable structural unit that typically consists of several strokes. While an EA character is the most complex type of radical, a simple single stroke is the most elemental type of radical. From both a language and character recognition point of view, an approach that uses some type of radicals between the complex and elemental ends of the spectrum can be more effective than an approach that uses only elemental stokes. However, numerous radical sets exist that can completely represent an entire set of EA characters. The simplest radical set is the elemental stroke set, which has the smallest model size but the poorest description precision. In contrast, the most complex radical set is the whole character set, which has the best description precision but also the largest model size. A proper radical set should balance model size and description precision.

An exemplary model for EA character recognition that uses radical and connection information is described herein. Connection information pertains to spatial relationships between radicals (i.e., information pertaining to how a radical is positioned with respect to another radical). As a radical may assume different positional relationships with respect to one or more other radicals, such connection information is of value for enhancing character recognition (e.g., improved speed, accuracy, model size, etc.).

The exemplary HMM model for EA character recognition includes both radical HMMs and connection HMMs. For example, the exemplary HMM may include, for each EA character, concatenated radical HMMs and connection HMMs.

Techniques for selection of a radical set are disclosed in co-pending U.S. patent application Ser. No. 11/680,566, entitled "Radical Set Determination for HMM Based East Asian Character Recognition", filed Feb. 28, 2007, which is incorporated herein. In particular, this aforementioned application discloses two approaches for radical set selection, referred to as: (i) a progressive splitting graph (PSG) technique and (ii) as a generality/complexity (G/C) technique. In general, an exemplary character recognition system will use one or the other technique to determine an optimal radical set that can represent a set of EA characters.

Technique for Character Recognition

Figure 2:
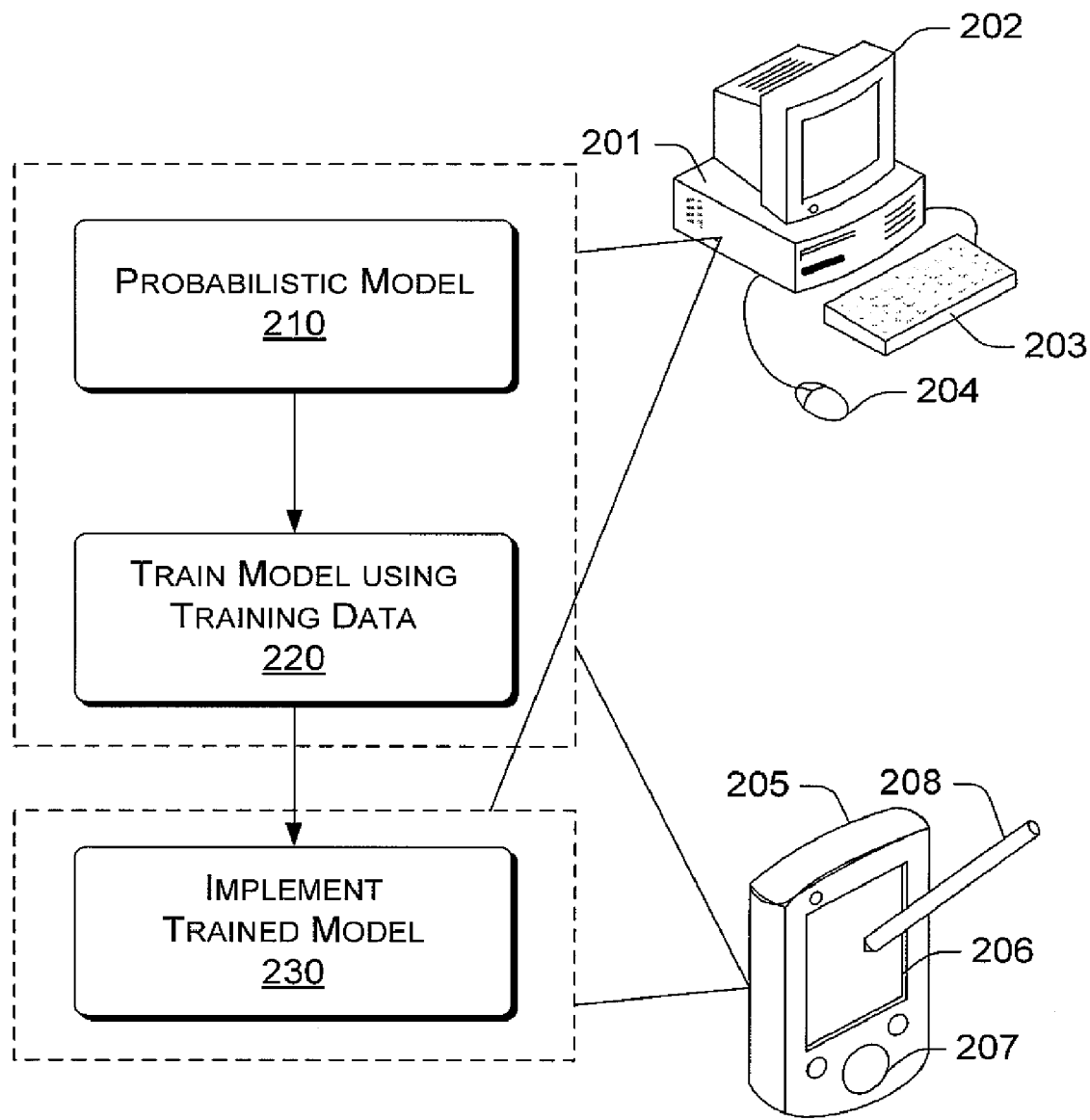
FIG. 2 is a diagram of a technique for character recognition with a probabilistic model implemented on one or more computing devices, according to one embodiment the probabilistic model may be a radical-based Hidden Markov Model.

FIG. 2 shows a general technique for character recognition 200 using a probabilistic model along with some examples of computing devices that may implement all or part of such a technique. The general technique includes selection of a probabilistic model 210 (e.g., a Bayesian model, HMM, or other type of probabilistic model), training of the model using training data 220 and implementation of the trained model 230. Training data may be from individuals that have drawn the various characters or it may be generated data based on rules commonly used in drawing various characters.

FIG. 2 shows computing devices 201 and 205, which may be a desktop computer and a handheld computer, respectively. The computing device 201 includes a display 202, a keyboard 203 and a mouse 204. The computing device 205 includes a display 206, user input feature(s) 207 and a stylus 208. In either example, a user may draw an EA character and the implemented trained model 230 may recognize the drawing (e.g., strokes) as being a particular EA character. In turn, the computing device may take any of a variety of actions (e.g., audible response, character selection and display response, etc.). As described herein an exemplary radical-based HMM may be a probabilistic model, as in block 210, and trained and/or implemented as in blocks 220 and 230, respectively. Details of exemplary techniques for training are discussed below.

Exemplary Technique for Character Recognition

Figure 3:
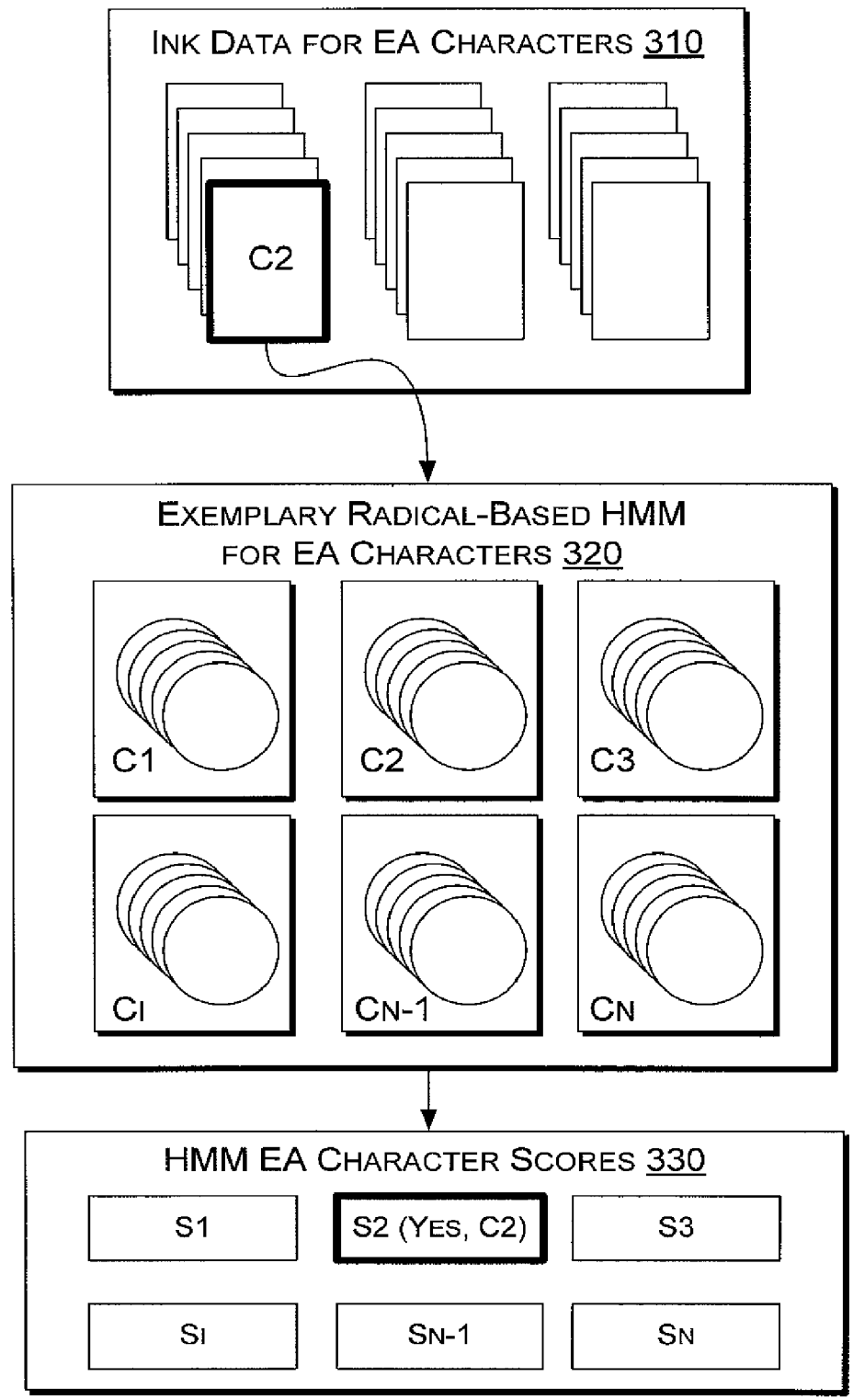
FIG. 3 is a diagram of an exemplary technique for character recognition, according to one embodiment.

FIG. 3 shows an approximate diagram of an exemplary technique for character recognition 300 that uses a radical-based HMM that includes concatenated character's radical HMMs and character's connection HMMs. As already mentioned with respect to FIG. 1, a person may draw a character "C2", where the "ink data" for that character is received by a character recognition system. While the person knows that he or she drew the character "C2", it is often desirable for some type of machine based recognition of the character for purposes of one or more subsequent actions. To achieve this recognition, to some degree of probability, the exemplary radical-based HMM for a set of EA characters 320 receives the ink data for C2.

The radical-based HMM 320 includes trained HMMs for each character of the EA character set of interest. In FIG. 3, these HMMs are concatenated character's radical HMMs and character's connection HMMs, as represented by blocks C1, C2, ..., CN. As shown in the example of FIG. 3, the radical-based HMM 320 matches the whole character ink data provided by the user to each character's HMM to calculate a score. A score block 330 indicates a series of scores of the corresponding radical HMMs and connection HMMs, where the highest score is selected as the EA character corresponding to the whole character ink data of the user (e.g., S2).

As described, for a radical-based HMM that includes radical HMMs and connection HMMs, a score can be a summation of scores of corresponding radical HMMs and connection HMMs. Accordingly, the EA character is composed of a plurality of radicals and connections between at least two of the radicals.

Thus, according to the example of FIG. 3, an exemplary method for character recognition (e.g., implemented at least in part by a computing device) can include receiving ink data for a character and recognizing a character as associated with the received ink data using a radical-based Hidden Markov Model (HMM) where the radical-based HMM includes radical nodes (where a radical node represents a structural element of a character) and connection nodes (where a connection node represents a spatial relationship between two or more radicals). In such a method, the radical-based HMM can include a multi-path topology where at least some paths of the multi-path topology traverse one or more radical nodes and one or more connection nodes. In general, such a radical-based HMM is a finite state machine, which may include durative states and/or turning states where a durative state represents a stroke forming action in forming a character and where a turning state represents a turning action in forming a character (see, e.g., description further below). The aforementioned exemplary method may include radical nodes that represent radicals in a contextual radical set where the contextual radical set accounts for shape variance of radicals with respect to characters (see, e.g., description further below).

Modeling East Asian Characters

Figure 4:
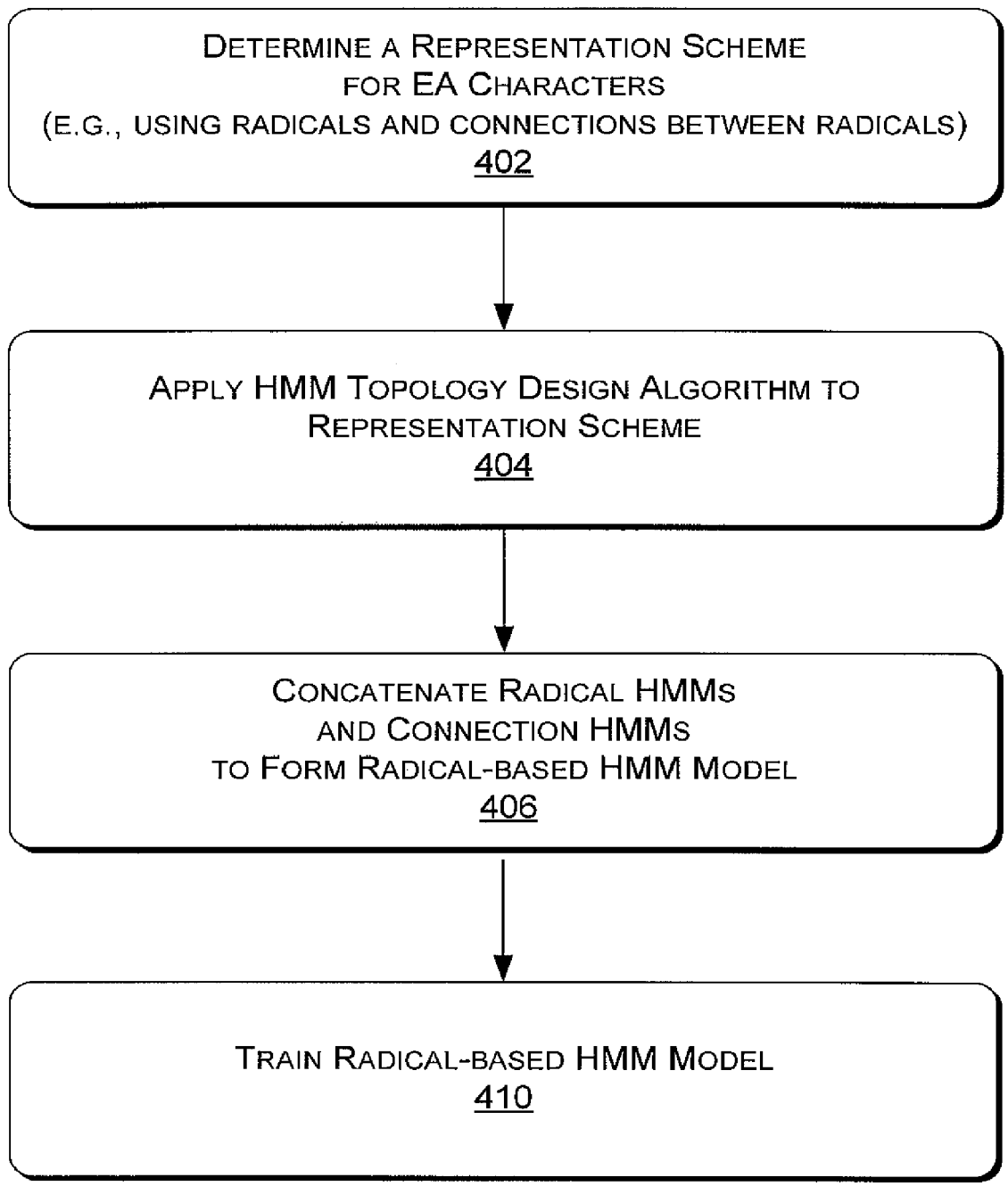
FIG. 4 is a flowchart of an exemplary method for modeling East Asian characters, according to one embodiment.

FIG. 4 is a flowchart of an exemplary process for modeling East Asian characters. As described herein a radical may be used to model multiple East Asian characters, which can result in less memory space, as only one parameter copy of the radical is needed. For example, a set of about 1,000 radicals can model 20,000 EA characters. Hence, a radical-based HMM can operate to recognize an entire set of EA characters using a common set of radicals. With a common set of radicals, only one copy of each radical needs to be kept in a database, storage, memory, or the like. Furthermore, a radical-based approach can provide for extensibility. For example, new characters may be constructed through use of existing radicals or new radicals may be added to a common set. In addition, with use of a radical-based approach, there is less of a problem of a writing order at a radical level than at a character level, which can reduce the number of paths required in a single multi-path HMM.

As already mentioned, an exemplary radical-based HMM uses radicals and connections between radicals. More specifically, a radical-based HMM uses concatenated radical HMMs (radicals as nodes) and connection HMM (connections as nodes) to form a multi-path HMM for East Asian character recognition.

The modeling of East Asian characters commences with a determination block 402, to determine a representation scheme for each East Asian character using radicals and connections. The determination of radical sets and connection sets is made for all East Asian characters of interest (e.g., for a chosen set of East Asian characters). In essence, according to the method 400, East Asian characters are analyzed by any of a variety of techniques to be represented as radicals and connections between radicals. As described herein, to form a character recognition model, an HMM approach uses nodes that represent radicals and nodes that represent connections.

A design block 404, illustrates how modeling of the radicals and the connections of the representation scheme uses a HMM topology design algorithm. This topology is developed with a systematic and data-driven algorithm to better model online handwriting of East Asian characters, resulting in a more accurate and more reliable character recognition system.

An exemplary systematic multi-path topology design algorithm includes (i) subsequence direction histogram vector (SDHV) based clustering to determine optimal path number, (ii) curvature scale space (CSS) based sub-stroke segmentation to determine optimal state number for each path, and/or (iii) state connectivity design to solve uncertainty of real stroke and imaginary stroke connections. These three techniques (i, ii, and iii) can provide for an optimized radical-based HMM topology. An exemplary design algorithm may apply one or more of these three techniques to provide an optimized HMM topology.

As described herein, an exemplary radical-based HMM is a finite state machine where a path (and hence state index) progresses in left-to-right order (i.e., a left-to-right HMM). An exemplary data-driven approach determines number of paths in a HMM. This results in an overall HMM topology that is multi-path, where each trained path represents a primary writing pattern of an East Asian character, such as one writing stroke-order or one writing style.

As previously explained with respect to FIG. 3, concatenation block 406 provides for proper concatenation of radical HMMs and connection HMMs in a radical-based HMM. To model different writing orders and various writing styles of a radical, a radical-based multi-path HMM may account for variant writing orders and styles of the same character for online handwritten character recognition.

In the method 400, a training block 410 provides for training of the radical-based HMM. A trained, radical-based HMM for EA character recognition includes trained radical HMMs and trained connection HMMs for each character of the EA character set of interest. An exemplary training technique is described below.

Development and Training of a Radical-Based HMM

Techniques discussed herein pertain to a radical-based HMM for online recognition of handwritten EA characters. While general design considerations were discussed with respect to the method 400 of FIG. 4, more specifically, design can be represented as a topology $\tau$, which can be decomposed into three problems: $\tau = \tau_P \circ \tau_{P,S} \circ \tau_{P,S,G}$ $$\tau = (P) \circ (S_P) \circ (R_{S_P}, G_{S_P})$$

In the foregoing formula, $P = \{P_i\}$ is the set of paths with $P_i$ being a single left-to-right path, $S_P$ is the set of states, and $R_{S_P}$ and $G_{S_P}$ represent the state connectivity and Gaussian mixture model, respectively. The HMM topology is fully determined once $P$, $S_P$, $R_{S_P}$ and $G_{S_P}$ are determined.

Various data-driven algorithms can help in development and/or training of such a HMM. For example, an algorithm can fully utilize training data (e.g., ink data) to determine a number of paths in a HMM using, for example, a subsequence direction histogram vector based technique (SDVH). An algorithm may also determine the number of states on various HMM paths via curvature scale space (CSS) based corner detection (see, e.g., corners in FIG. 1). In addition, self-rotation restricted corner states (also referred to as turning states) can be used to enhance state alignment. In general, such techniques can be used to construct size-efficient and extensible radical-based HMMs for an EA character set and, when trained, achieve high recognition accuracy.

Development and/or training of an exemplary radical-based HMM may include use of one or more data-driven algorithms to (i) determine HMM path number (e.g., formalized as a clustering problem and solved using iterative path splitting and SDHV-based clustering), (ii) calculate the optimal state number and initial state parameters (e.g., using CSS-based sub-stroke segmentation), and/or (iii) determine state connectivity and Gaussian mixture number in order to achieve better state alignment (e.g., using a self-rotation restricted corner state and an imaginary stroke state).

Figure 5:
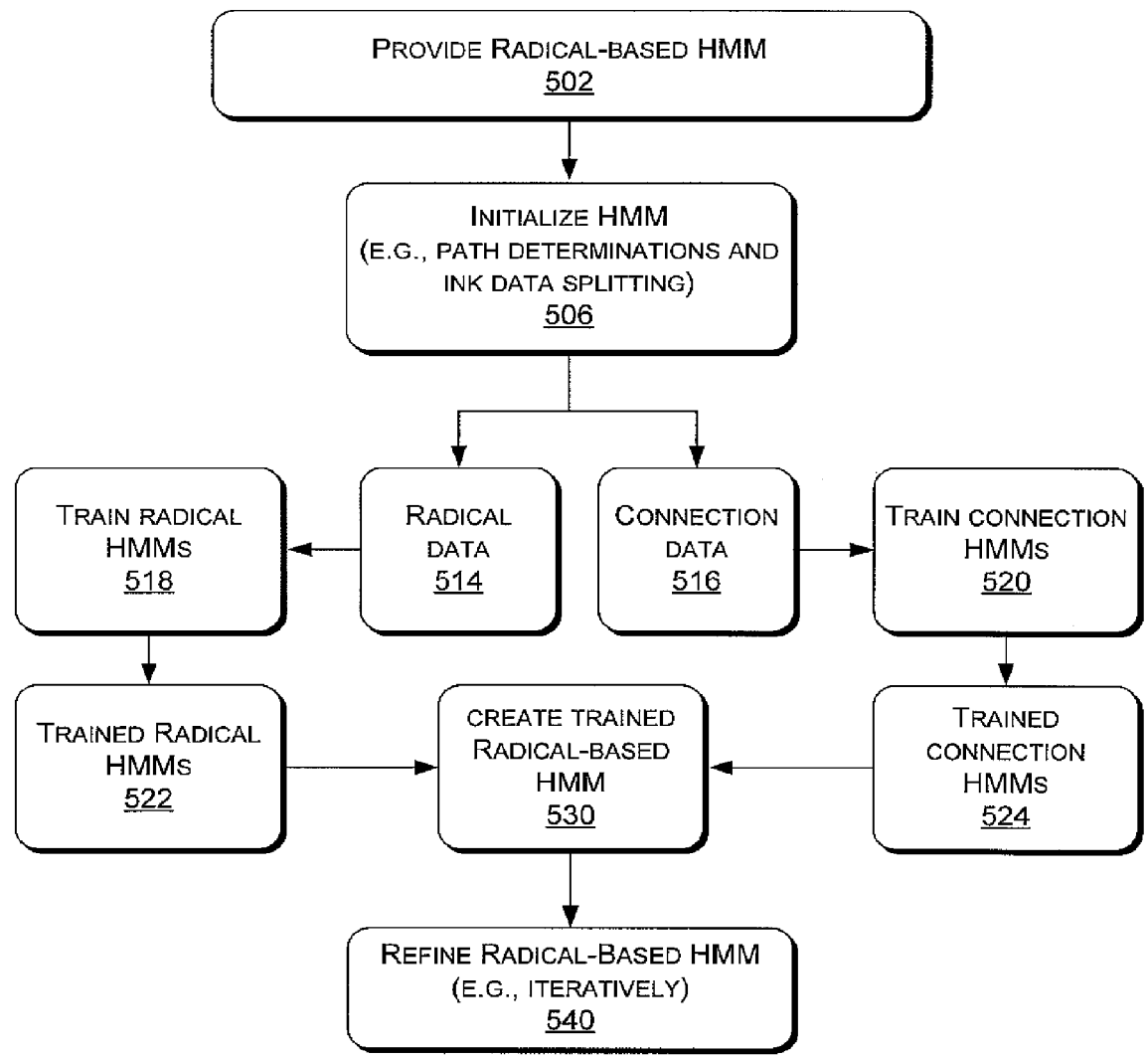
FIG. 5 is a flowchart of an exemplary process for developing and training a radical-based HMM, according to one embodiment.

FIG. 5 is a flowchart of a development and training process for an exemplary radical-based HMM. As already mentioned with respect to FIG. 2, prior to use, a probabilistic model requires training using training data. In general, training is an iterative process whereby values are determined for parameters of the model. More specifically, training seeks to optimize these values such that the resulting trained model can be used with a high degree of accuracy.

As the problem of finding accurate values for the numerous parameters of a HMM (e.g., fitting the parameters to the training data) is typically not amenable to any exact solution technique, a variety of iterative solvers or solution techniques have been developed. In general, an iterative technique requires some initial estimate or guess for the values of the parameters of an untrained radical-based HMM.

Training relies on data and high quality data is typically desirable. In other words, poor data, whether limited in scope or volume, usually leads to a trained model of limited use or accuracy. In some instances, data may need to be processed prior to or as part of training. As described, an exemplary method processes training data in a manner that accounts for the nature of the model to be trained.

Prior to discussing some details, in general, an initial or coarse HMM (per block 506) can be used to split ink data into radical data and connection data, as indicated by a radical data block 514 and a connection data block 516. With an initial (or coarse) HMM, a HMM decoder (e.g., Viterbi algorithm-based decoder) can align ink frames with HMM states. Upon alignment of ink frames with states, radical and hence connection boundaries are known. With such boundary information, character ink data may be split into radical data 514 and connection data 516.

As discussed in greater detail below, a radical-based HMM has an associated topology. For an iterative training process (e.g., per block 540), in each iteration topology is not changed after a topology design algorithm is applied. The topology of an exemplary HMM is determined by ink data and design algorithm, hence, between different iterations, topology may differ.

As indicated in FIG. 5, the exemplary method 500, commences in a provision block 502 that provides an untrained radical-based HMM, for example, as discussed with respect to FIG. 4 (e.g., it includes radical HMMs where radicals are nodes of the HMM). Prior to commencing training, the manner by which a character can be represented by particular radicals and particular connections is assessed. Some manual labeling work may be used to get this type of information or, as already mentioned, various techniques may be used for selection of a radical set. As already described, once a radical set has been selected, particular connections for the radicals (e.g., on a character-by-character basis) may be understood by observation or other techniques.

Auto Generation of Data and Paths: Path Splitting Algorithm

The development and training method 500 continues in an initialization block 506 that includes initializing or providing a radical-based HMM. As described herein, the initialization step includes radical labeling of data, which can be automatically generated by cutting ink data for radicals at their alignment boundaries. Auto generation of radical data relies on accurate alignment provided by a well designed HMM topology, however, circular dependency occurs in auto generation of radical data where the auto generation relies on the underlying model to be trained. To break this circular dependency, an iterative path splitting algorithm is used.

The path splitting algorithm commences by initializing an HMM with a single path (e.g., n=1). The algorithm considers an existing number of paths "n" (denoted paths $P_1, P_2, \ldots, P_n$) and calculates a convergence measure value for each of these paths (denoted convergence measures $C(P_1), C(P_2), \ldots, C(P_n)$). The algorithm then selects the path $P_j$ with the maximum convergence measure value. Of course, such an algorithm requires definition of an appropriate convergence measure, referred to as $C(P)$. Noting that any of a variety of convergence measures may be used, as discussed herein, an exemplary convergence measure accounts for rotation and translation. For example, an exemplary convergence measure may be defined as follows:

$$C(P) = \frac{\sum_{s \in P} Cov_s \cdot \left(1 + \frac{Rotate_s}{Trans_s}\right)}{\sum_{s \in P} \left(1 + \frac{Rotate_s}{Trans_s}\right)}$$

For this convergence measure, $Cov_s$ is the covariance of state s, and $Rotate_s$ and $Trans_s$ are self-rotation probabilities and leaving transition probabilities, respectively. The exemplary convergence measure may be considered, intuitively, as being based on the covariance expectation per ink frame on a path $P_i$.

Given $C(P_j)$, the algorithm applies a convergence threshold T as follows: if $C(P_j)<T$ then stop path splitting. When this condition is met, the algorithm clones $P_j$ and adds noise to construct a new path. The process continues to train the radical-based HMM with n+1 paths, for example, until recognition accuracy cannot be improved or other criterion.

Although training data as well as HMMs for each radical are obtained using the aforementioned algorithm, the resulting HMMs are not yet optimized due to two reasons: (i) at this juncture, the number of paths is usually large; and (ii) some radical samples of different writing order and styles may be still modeled by the same path. Hence, reduction of the number of paths occurs, for example, to a number sufficient for accurate radical alignment. To reduce the number of paths, another data-driven algorithm is used for path number determination.

Path Number Determination: SDHV Clustering

The initialization block 506 includes automatically splitting ink data by a coarse radical-based HMM into ink data for radicals (radical data 514) and ink data for connections (connections data 516). This ink data splitting provides ink data for refining and training radical HMMs and connection HMMs, and solves the problem of manually labeling the ink data for the radicals and the connections from the whole character data, which is very expensive and labor intensive. However, the aforementioned auto generation technique typically results in an inordinate number of paths. Hence, an exemplary method uses a clustering algorithm to cluster ink data into "m" clusters with "m" being the optimal HMM path number. Accordingly, a goal is to elect a feature that well represents both shape and temporal information of the same radical in order to achieve optimal clustering based on writing style and order. As described herein, a statistical feature referred to as a Subsequence Direction Histogram Vector (SDHV), can be used to achieve this goal.

The SDHV approach can use an ordered list of SDHs to describe both the writing order and style of a radical ink sample where all strokes of a sample can be uniformly segmented into "M" subsequences. Temporal concatenation of the SDHs of the "M" subsequences results in the Subsequence Direction Histogram Vector (SDHV) of dimension M*N. The SDHV can be convoluted with a discrete that function φ, (e.g. a Gaussian function) to make it more robust to the shifting in segmentation:

$$SDHV = (SDH_1, SDH_2, \ldots, SDH_M)$$

$$SDH_i^* = \sum_{j=1}^{M} \varphi(i-j) \cdot SDH_j$$

In such a manner an appropriate number of paths can be determined.

State Design: Curvature Scale Space (CSS)

Another aspect of initialization is state design. State design includes two tasks: (i) to determine the number of states in each path; and (ii) initial parameter values of the states. In general, appropriate initial values for model training should be set in order to avoid getting into bad local minima (e.g., which would provide local "optima" with accuracy less than that of values associated with a global minimum). Another task for a radical-based HMM is to design the state connectivity and determine the mixture number in order to achieve accurate alignment between ink frames and states via utilizing the structural properties of EA characters.

With respect to determination of state number for each HMM state path, a data-driven approach can be used. In particular, radical sample data in the same cluster generated by the SDHV clustering algorithm may be used.

For example, each radical ink sample provides a curve of a pen tip locus after consecutive ink strokes are connected with imaginary strokes. This curve consists of sub-strokes with low curvature separated by high-curvature corner points. The state number is the summation of the numbers of sub-strokes and corners. Because sub-strokes and corners appear alternately, the number of states $N_{state}$ is $2*N_{sub-stroke}-1$. A robust coarse-to-fine algorithm in the Curvature Scale Space (CSS) can be used to conduct corner point detection. Because the radical ink samples in the same cluster have the same writing order and similar writing styles, the number of sub-strokes detected on each pen tip curve should have small variation. A voting mechanism can be used to obtain the number of states with a majority of votes. The initial parameter values of the states can then be determined using the ink samples that contribute the majority of votes.

State Connectivity Design: Turning States

With respect to state connectivity design, a sub-stroke state models several ink frames in the same sub-stroke, so that it is self-rotating and has a transition to a subsequent turning state. On the other hand, a turning state cannot self-rotate. Therefore, the ink frames of the two consecutive sub-strokes are separated at the most suitable place by only one ink frame which is aligned to the turning state. Self-rotation restricted turning states are a structural characteristic as well as imaginary strokes, noting that the latter is different from a real ink stroke in that it does not have ink sample points and an imaginary stroke is always assumed to be straight. Imaginary ink frames should never align with real sub-stroke states. Real ink frames may align with imaginary sub-stroke states in fluent and cursive handwriting. In order to utilize these properties to achieve better alignment, a model can account for imaginary strokes using a Gaussian Mixture Model (GMM) with mixture number 2 to differentiate real and imaginary sub-stroke ink frames.

Training a Radical-Based HMM

Given the radical data 514 and the connections data 516, training of the radical HMMs and training of the connections HMM may commence. As indicated by blocks 518, 520, training trains radical HMMs and connection HMMs with their corresponding ink data and to produce trained radical HMMs 522 and trained connection HMMs 524. After a first round of training, a collection block 530 collects the trained radical HMMs 522 and the trained connection HMMs 524 to build a refined radical-based HMM.

In general, this refined radical-based HMM can be used for a subsequent iteration, per refinement block 540 where the refined radical-based HMM further trains the radical-based HMM. More specifically, the training process can use the more refined HMM model to get better radical data by re-splitting the ink data. Thus, the training process may proceed iteratively to refine the model and thereby increase character recognition accuracy. The iterative process may be terminated once a certain level of accuracy is achieved, after a certain number of iterations, or upon meeting an error or other criterion. Once the model has been trained and refined, the radical-based HMM is ready to be used in a system for online handwriting recognition of EA characters.

According to the example of FIG. 5, an exemplary method for training a radical-based HMM for character recognition (e.g., implemented at least in part by a computing device) can include providing an initial radical-based HMM that includes radical nodes and connection nodes, splitting character ink data into radical data and connection data using the initial radical-based HMM, training radical HMMs with the radical data and training connection HMMs with the connection data and generating a trained radical-based HMM by concatenating the trained radical HMMs and the trained connection HMMs. In such a method, the generating process can include determining a number of paths for the trained radical-based HMM, for example, using subsequence direction histogram vector (SDHV) clustering and/or the generating process can include determining a number of states for the radical-based HMM, for example, using curvature scale space-based (CSS) corner detection. Training can occur iteratively using the character ink data. For example, a method can include splitting character ink data into radical data and connection data using a trained radical-based from an intermediate iteration which may not be fully trained or refined. In such a manner, more refined trained radical-based HMM can be generated using the radical data and the connection data split a trained radical-based HMM from an earlier iteration.

With respect to an initial radical-based HMM, an exemplary method for generating an initial radical-based HMM can include selecting a set of characters, providing a set of radicals that can represent the characters, providing types of connections that represent relationships between two or more radicals of the set of radicals and generating an initial radical-based HMM by constructing paths through nodes that represent radicals and nodes that represent types of connections using a path splitting algorithm that applies a convergence measure. Such a method may use a convergence measure that depends on self-rotation probabilities and leaving transition probabilities.

An exemplary system configured to perform character recognition can include a processor, an input for receiving character information and control logic (e.g., implemented at least in part by the processor), to recognize a character as associated with the received character information using a radical-based Hidden Markov Model (HMM) where the radical-based HMM includes radical nodes and connection nodes and control logic to perform one or more actions related to recognition of the character (e.g., storage to memory, audible signal, visual display, etc.).

Process of Radical Representation for East Asian Characters

Figure 6:
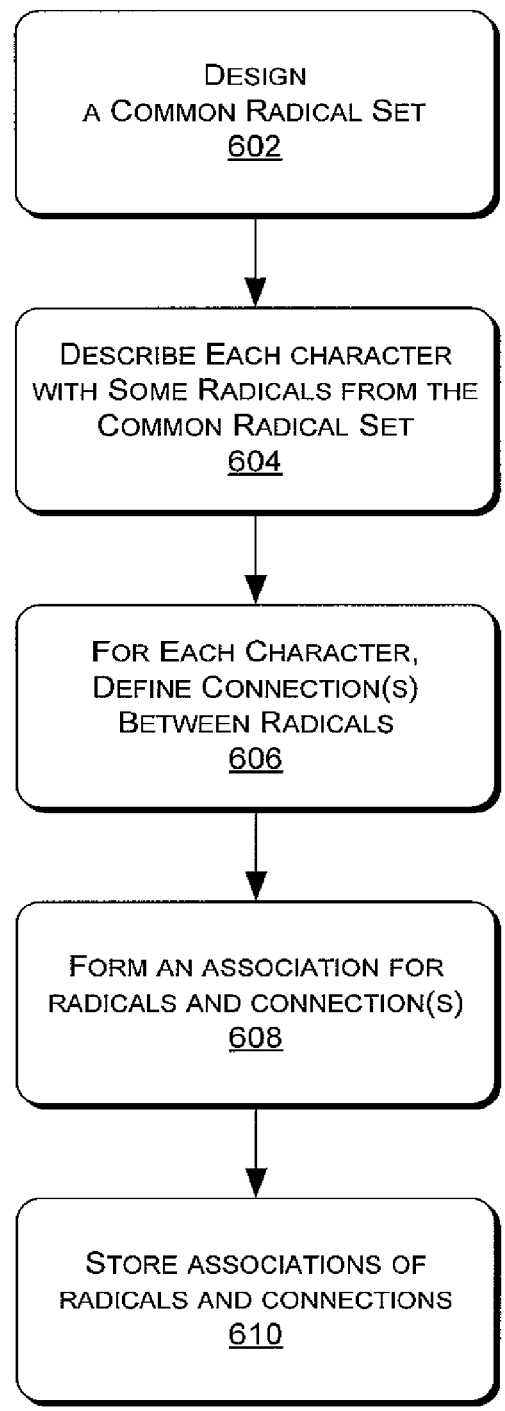
FIG. 6 is a block diagram of an exemplary process for representing East Asian characters using radicals and connections, according to one embodiment.

FIG. 6 is a flowchart of an exemplary process for representing EA characters with radicals and connections 600. Block 602 illustrates designing a radical set according to one or more criteria so that the radicals can represent an East Asian character set and be capable of use in one or more size-efficient models. The designed or selected radical set is identified herein as a "common radical set". This is possible by identifying a common radical set (or an extended contextual radical set) and the connections used to represent East Asian characters. Such a process can identify sub-stroke lengths in radicals with different shapes, as being shape-variant. As described herein, an exemplary model includes use of shape-variant radicals, where these radicals comprise an extended contextual radical set. More discussion of such radicals follows in the description for FIG. 7.

Representing EA characters with radicals generally results in a number of radicals that is much less than the number of EA characters in EA language. Given a radical set having fewer members than its corresponding EA character set, fewer radicals are required to perform actions yet extensibility, accuracy, etc., of a character recognition system may be improved. Further, with a smaller number of representations, the number of steps needed for modeling and training of the radicals can be reduced while resulting in a more refined and accurate model.

In block 604, each East Asian character is described with some common radicals that are selected from the common radical set. The selected radicals for a given character are then identified as "representative radicals" for that character.

As an exemplary radical-based HMM relies on both radicals and connections, given a set of radicals for representation of a character, connections must be defined that provide an understanding of how two or more radicals are organized to represent the character. As described herein, radicals and connections may be integrated and statistically analyzed to represent an East Asian character.

In block 606, a type of connection is defined between two or more of the common radicals. As mentioned previously, a connection pertains primarily to the spatial relationship between radicals. Radicals may assume different positional relationships to one another, such as on top, below, or next to another radical. These relationships and corresponding connections are discussed in more detail with respect to FIG. 7.

Given the radicals of block 604 and the connections of block 606, a formation block 608 forms appropriate associations between the radicals and the connections, understanding that some radicals may have no relationship to one or more other radicals and hence no association with a particular connection. More specifically, the formation block 608 aims to select radicals from the common radical set and select a type of connection for establishing a relationship between two or more radicals for each East Asian character.

A storage block 610 follows to store associations between connections and common radicals. Such stored association information can be retrieved as required. The method 600 may be considered as providing a radical structure for each EA character in an EA character set. This manner of representing characters can be output to a dictionary, which can be used by a training process or other process.

Radicals and Connections for Representation of East Asian Characters

Figure 7:
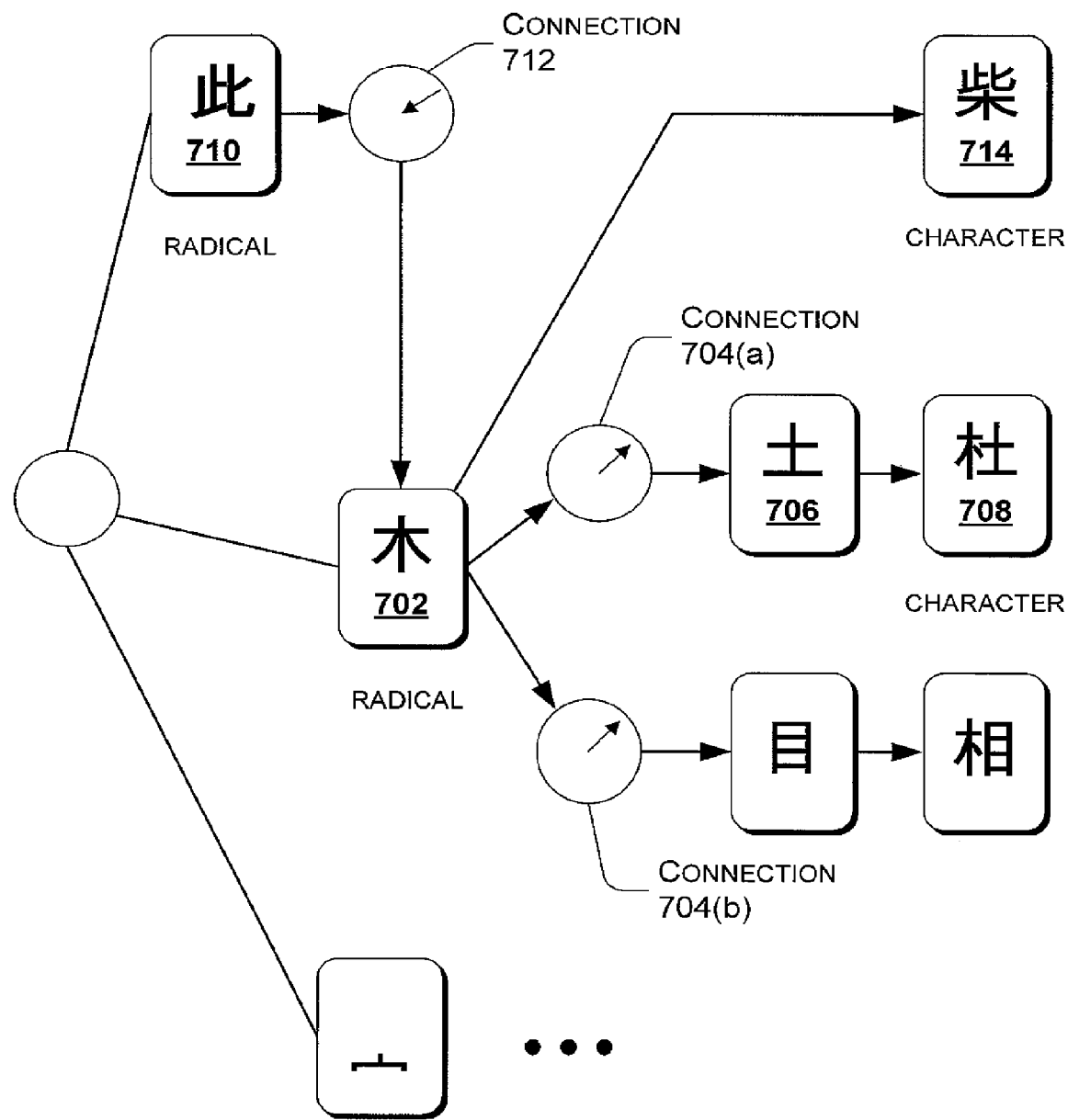
FIG. 7 is a schematic of exemplary topology represented by radical nodes and connection nodes, according to an embodiment.

As mentioned throughout, a radical-based HMM includes concatenated radical HMMs and connection HMMs. While such a HMM can be described mathematically, FIG. 7 sets an exemplary radical-based HMM in a graphical context. Indeed, some consider a HMM a graphical model for modeling sequential data. FIG. 7 is a block diagram of exemplary radicals and connections 700 used to represent East Asian characters in a radical-based HMM. Again, an individual radical may be considered a "node" of one or more HMMs and an individual connection may be considered a "node" of one or more HMMs. In general, for a HMM, a node represents a state and may be referred to as a "state node". Parameters of a HMM include probabilities for state-to-state transitions. Again, values for these probabilities are typically obtained through training that relies on "real-world" data to thereby provide a trained model that can predict a probable outcome given some input data. As described herein, input data is typically whole character ink data and the probable outcome is the character that corresponds to the input ink data, i.e., character recognition. As an exemplary radical-based HMM is multi-path, this provides for flexibility in that different ink data (input) can lead to the same character (output), for example, where a character may be drawn with some degree of variability.

As described with respect to FIG. 7, ideographic characters may be broken down into four basic categories of radicals. For example, an exemplary method may use the following categories: (i) vertical division, (ii) horizontal division, (iii) encapsulation, and (iv) superimposition.

As previously mentioned, connections may be used to describe the spatial arrangement of radicals with a particular EA character. The spatial information can be considered as being used to help with formation of a plurality of radicals into an EA character. Again, such an arrangement of radicals and connections allows for rendering characters using some set of common radicals and some types of connections. Thus, a type of connection between two or more radicals may be defined.

In FIG. 7, some radicals and characters are illustrated inside rectangular boxes (e.g., 702, 706, 708, 710, 714) and some connections are illustrated inside circles (e.g., 704(a), 704(b), 712). In the example of FIG. 7, a radical commonly used in EA characters is the radical "木", identified as radical 702. The connections positioned to the right of radical 702 "木", are of similar types and are identified as 704(a) and 704(b). The second radical shown to the right of connection 704(a), is the radical "土", identified as radical 706. In this example the radical 702 "木", 702; the connection 704(a); and the radical 706 "土", 706; are appropriately associated to represent the Chinese character, "杜", identified as character 708.

For example, the radical "木", 702; is in the vertical category, such as being positioned either to the right or to the left of an associated radical. In this example, radical "木", 702 is located to the left of the associated radical, "土", 706, when used to represent the East Asian character "杜", 708. Thus, the radical, "土", 706, would also be considered in the vertical category, being located to the right of the radical "木", 702, in the East Asian character "杜", 708.

In another example, the radical "此", identified as radical 710 is shown next to the connection, identified as connection 712. The connection, 712, points downwards (e.g., compare to the other types of connections 704(a), 704(b), which point upwards). This pointing relationship indicates the type of connection assigned to connection 712, which can be used to properly associate two radicals. Hence, when an association occurs for the radical "此", 710; the connection 712; and the radical "木", 702; a corresponding character "柴", is identified (character 714).

In the foregoing example, the radical "木", 702, is in the horizontal category, where the radical is spatially located above or below another associated radical for a character. The radical "木", 702, sits below the radical "此", identified as radical 710 to form the EA character "柴", identified as character 714. Furthermore, the radical "此", 710, would be considered in the horizontal category as it sits above the other radical "木", 702.

These different combinations of radicals can cause one or more of the radicals to be horizontally or vertically combined and, in particular, "squeezed" to form a character. To account for this phenomenon, one or more lengths of a sub-stroke in the radical "木", 702, can be assigned or transformed, i.e., have different shapes and thereby be shape-variant. As mentioned, a sub-stroke is a line segment of a basic stroke. Based on these observations, radicals with different shapes can be treated separately. As a result, there are extended "contextual" radical sets, i.e., the context in which a radical appears is accounted for through use of a contextual radical set. Thus, a contextual radical set, as described with respect to FIG. 7, accounts for shape-variance of a radical with respect to the radical's context.

As described herein, radicals in a common radical set used for EA characters may have different shapes, according to the characters represented by any particular radical. In other words, radicals in the designed radical set (common radical set) of the design block 602 of FIG. 6 can be shape-variant and the radical set can be a contextual radical set, referred to sometimes as an extended contextual radical set. Some advantages of a contextual radical set include improved recognition accuracy for a system that uses a radical-based HMM and decreased complexity of a radical-based HMM.

FIG. 7 illustrates shape-variance, i.e., the shape of radical 702 "木" in character 714 "柴" and the shape of radical 702 "木" in character 708 "杜" is different. Shape-variance, to some degree, increases complexities of a radical HMM for the radical 702 "木". As described herein, an exemplary technique reduces accompanying complexities of a radical HMM for a shape-variant radical.

An exemplary technique defines an extended contextual radical set, based on the radical's shape in the common radical set. For example, radical 702 "木" in character 714 "柴" is identified as radical "木", while radical 702 "木" in character 716 "相" is identified as radical "木". While the size of an extended contextual radical set is larger than the corresponding non-shape variant common radical set, use of an extended contextual radical set has advantages with respect to recognition accuracy.

State Sequences of Turning and Sub-Strokes

Figure 8:
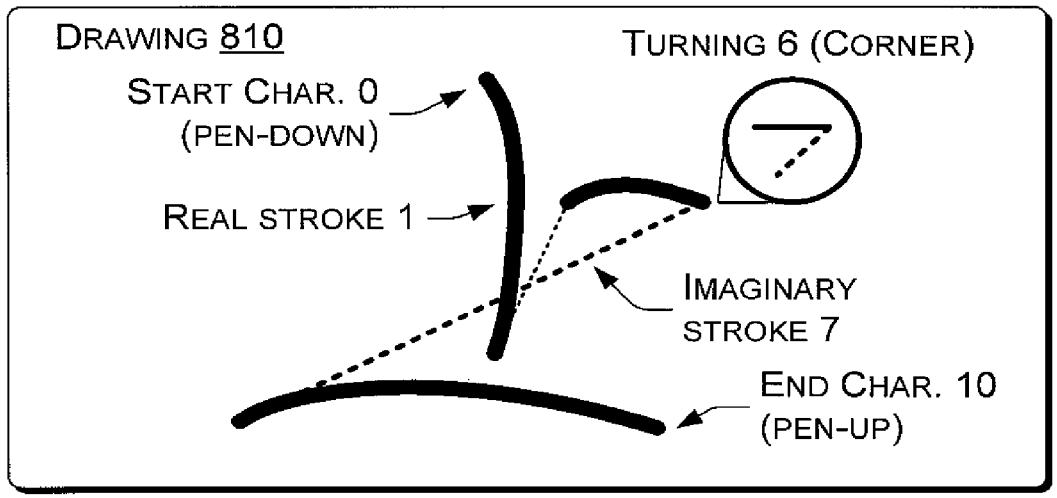
FIG. 8 is a schematic of exemplary state sequences that include durative states and turning states, according to one embodiment.
Figure 8:
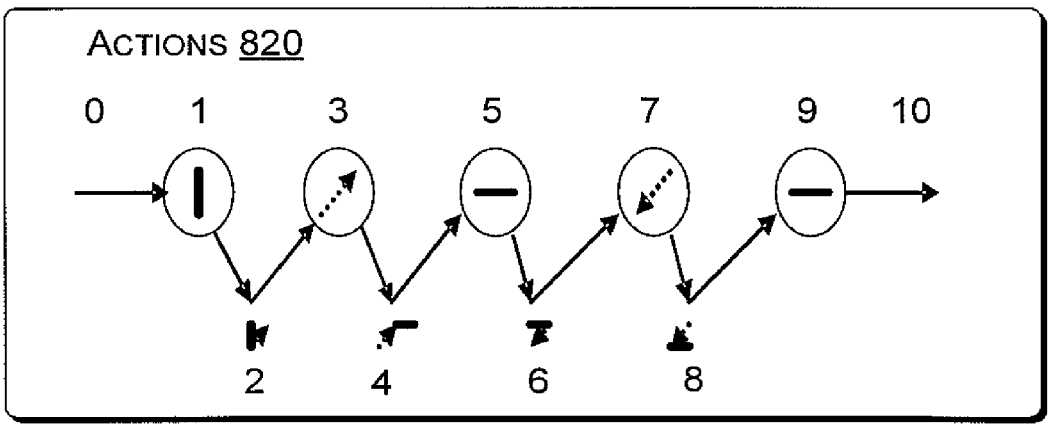
Figure 8:
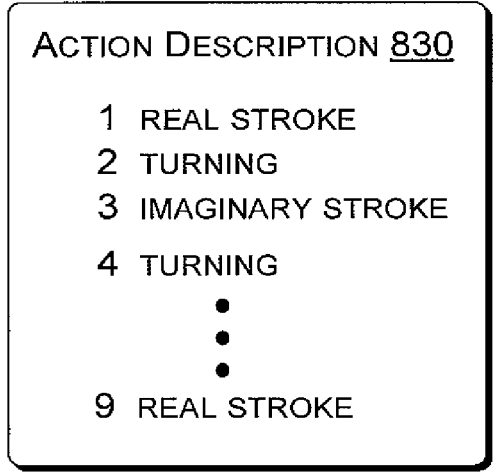
Figure 8:
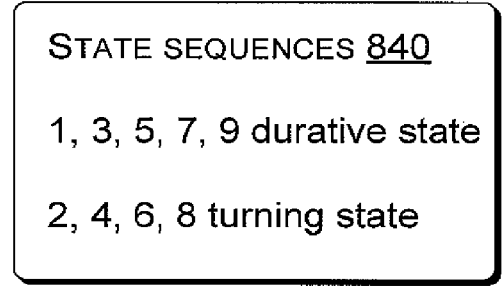

FIG. 8 is a schematic of an exemplary process for East Asian character state sequences of turning and sub-strokes 800. As described herein, an exemplary HMM can include turning states and durative states as explained with respect to FIG. 8. FIG. 8 shows a drawing 810 with associated actions 820 and action descriptions 830 as well as state sequences 840. A HMM is a finite state machine which changes its state once every incremental unit (often referred to as a time unit). States are basic elements of a HMM. The underlining structure of the radicals and the connections are useful in guiding the modeling process, such as designing state sequences to fit to HMM approach to recognize EA characters.

Given the drawing 810, directions of all points except the start point and the end point in the same sub-stroke are always similar and the directions at the start point and at the end point always have a great spatial difference from other points of the character. Accordingly, an exemplary framework for EA character recognition defines an EA character as a sequence of sub-strokes and turnings, which appear by turns. Given this framework, turning states can be used to model variability of turnings while stable or durative states can be used to model variability of sub-strokes. Further, each radical and each connection can be modeled by a sequence of durable states and turning states (see, e.g., states sequences 840).

FIG. 8 illustrates the concept of a real stroke (e.g., action 1), an imaginary stroke (e.g., action 7), and a corner or turning (e.g., action 6). Basically, East Asian characters are composed of these basic strokes. A sub-stroke is a basic element of a radical and connection approach to modeling East Asian characters. Each sub-stroke is made of a sequence of points. The points may be represented by Cartesian coordinates (x, y), polar coordinates (r, Θ), or other coordinate systems. Usually, a stroke is described by a series of points with timestamps (x, y, time) (e.g., as data is collected by a computing device), A real stroke is a trajectory of a pen tip between a pen-down action and a pen-up action while an imaginary stroke is an imaginary line to connect between the pen-up action and next pen-down action.

When a person writes a character, a series of actions occur. These actions are labeled sequentially from 0 to 10 in block 820 of FIG. 8. Action 1 illustrates a real stroke pointing downwards. Action 3 is an imaginary stroke, which is a structural characteristic of East Asian characters. The imaginary stroke (action 3) is different from the real stroke (action 1), as there are no ink sample points and the imaginary stroke (action 3) tends to be straight or is assumed to be straight. Imaginary ink frames may not align with real sub-stroke states. Real ink frames may align with imaginary sub-stroke states in fluent and cursive handwriting.

As already mentioned, observations indicate that directions of all points (except start point and end point) in the same sub-stroke are similar and that the direction variations at the start point and end the point have a great difference from other points.

In FIG. 8, actions 2 and 4 represent turnings (e.g., turning states). As already mentioned, an East Asian character can be described as a sequence of sub-strokes and turnings where the states corresponding to sub-strokes and turnings can be considered separately. In particular, turning states can be defined as states corresponding to turnings, and used to model variability of turnings, while durative states can be used to model variability of sub-strokes. In an exemplary model, each radical and connection can be modeled by a sequence of durative states and turning states. In FIG. 8, durative states 1, 3, 5, 7, 9 and turning states 2, 4, 6, 8 are identified in block 840 as corresponding with the drawing 810.

A sub-stroke or durative state provides for modeling several ink frames in the same sub-stroke, so the sub-stroke is self-rotating and has a transition to a subsequent turning state. However, a turning state is set to non-self-rotate to get better state alignment. The ink frames of two consecutive sub-strokes are separated at the most suitable place by only one ink frame which is aligned to the turning state. But. As described herein, a turning state is not limited to non-self-rotate types of states, for example, a self-rotate state can also be use to model a stroke corner.

In an exemplary HMM model, a matrix $A=\{a_{ij}\}$ represents state transition probabilities of a character's HMM, $\pi=\{\pi_i\}$ represents for initial state probabilities and "N" represents state number of a character's HMM.

In a constrained left-to-right HMM, the following properties may be assigned:

a. If state i is a durative state, then $a_{ij}=0$ unless j=i or j=i+1, $1 \leq i < N$;

b. If state i is a turning state, then $a_{ij}=0$ unless j=i+1, $1 \leq i < N$;

c. The state sequence must end in state N: $a_{iN}=0$, $1 \leq i < N$; and d. The state sequence must begin in state 1, $\pi=(1, 0, \ldots, 0)$.

In this example, the constraint (a) demands that a durative state $S_i$ can only jump to a next state and is allowed to self-transition and the constraint (b) demands that a turning state $S_i$ can only jump to next state and that it is not allowed to self-transition. Note that the constraint (c) indicates that the last state $S_N$ can not be transited by any other state but $S_{N-1}$ and the constraint (d) demands that the initial state must be always $S_1$. Given these constraints, a constrained left-to right. HMM is defined.

Exemplary Computing Environment

Figure 9:
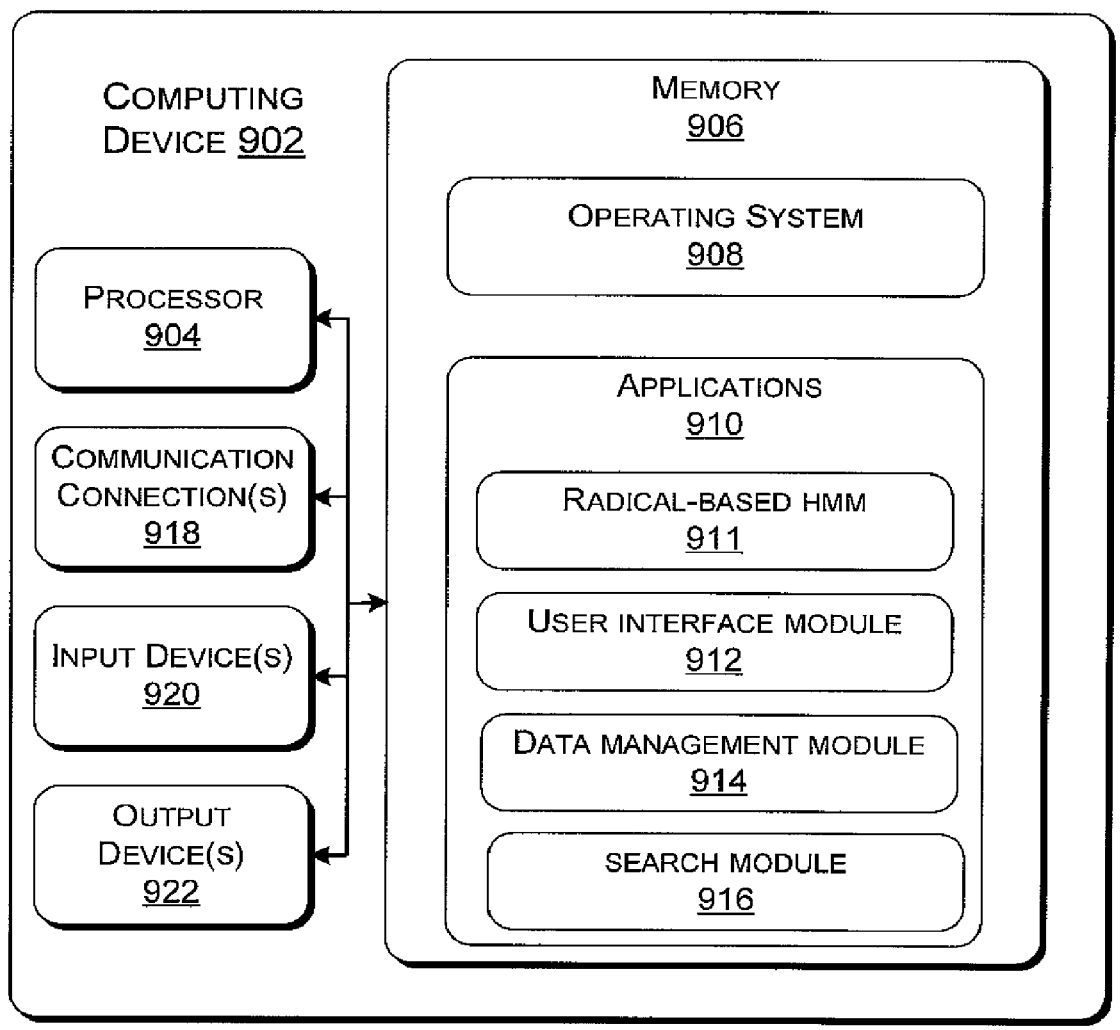
FIG. 9 is a schematic diagram of an exemplary general operating environment for development of, training of or implementation of an exemplary radical-based HMM, according to one embodiment.

FIG. 9 is a schematic block diagram of an exemplary computing environment 900 suitable for generating an initial radical-based HMM, training a radical-based HMM and/or implementing a radical-based HMM. The environment may be configured as any suitable computing device 902 capable of implementing an exemplary radical-based HMM, implementing an exemplary development method, implementing an exemplary training method, etc. In one exemplary configuration, the computing device 902 comprises at least one processor 904 and memory 906. Depending on the configuration and type of computing device, memory 906 may be volatile (such as RAM) and/or non-volatile (such as ROM, flash memory, etc.).

Memory 906 can store programs (e.g., instructions) capable of being executed by the processor 904 and memory 906 can store data such as data generated during execution of a program. Memory 906 may store any number of programs, data objects, other data structures, including an operating system, one or more application programs, other program modules, and program data.

Memory 906 may include an operating system 908, one or more application programs 910 for implementing an exemplary radical-based HMM, as well as various other data, programs, media, and the like. In one implementation, memory 906 includes instructions for an exemplary radical-based HMM 911. As shown, memory 906 includes instructions for a user interface module 912, instructions of a data management module 914, and instructions for a search module 916. Memory 906 may store data for the one or more applications 910.

The user interface module 912 can present a user with a graphical user interface (GUI) that may use an exemplary radical-based HMM. For example, such a module may cause display of an interface that can prompt a user to enter strokes for a character (e.g. character data). In turn, such a module may provide for display of information germane to character recognition or an application that uses character recognition. The data management module 914 manages storage of information, such as a database, radicals, types of connections, and the like, and may provide for communication with one or more local and/or remote databases. In the example of FIG. 9, the search module 916 can interact with the user interface module 912 and data storage module 914 to perform search functions, such as performing textual searches using text search methodologies.

Memory 906 may be a type of computer-readable storage medium. Volatile memory may include media such as random access memory (RAM) while non-volatile memory may include read only memory (ROM). The computing environment 900 may also include other removable/non-removable, volatile and/or non-volatile computer storage media. For example, the computing environment 900 may include a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Disk drives or other computer-readable media can provide non-volatile storage of computer readable instructions, data structures, program modules, and other data for the computing device 902.

The computing device 902 may also contain communications connection(s) 918 that allow the computing device 902 to communicate with a database, user terminals and/or other devices (e.g., accessible via a network). By way of example, and not limitation, communication may occur via a wired network or a direct-wired connection and/or via a wireless network (e.g., acoustic, RF, infrared and other wireless technique).

The computing device 902 may also include one or more input devices 920 such as a stylus-based device and one or more output devices 922, such as a display, speakers, printer, etc. A variety of such devices are well known in the art.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for character recognition, implemented at least in part by a computing device, the method comprising:
   receiving ink data for a character;
   recognizing the character as associated with the received ink data using a radical-based Hidden Markov Model (HMM), the radical-based HMM comprising radical nodes, wherein a radical node represents a structural element of a character, and connection nodes, wherein a connection node represents a spatial relationship between two or more radicals; and
   describing the radical-based HMM with a finite state machine that comprises at least one state selected from durative states or turning states.

2. The method of claim 1 wherein the radical-based HMM comprises a multi-path topology wherein at least some paths of the multi-path topology traverse one or more radical nodes and one or more connection nodes.

3. The method of claim 1 wherein the radical nodes represent radicals in a contextual radical set.

4. The method of claim 3 wherein the contextual radical set accounts for shape variance of radicals with respect to characters.

5. The method of claim 1 wherein the characters comprise East Asian characters.

6. A method for character recognition, implemented at least in part by a computing device, the method comprising:
   receiving ink data for a character;
   recognizing the character as associated with the received ink data using a radical-based Hidden Markov Model (HMM), the radical-based HMM comprising radical nodes, wherein a radical node represents a structural element of the character, and connection nodes, wherein a connection node represents a spatial relationship between two or more radicals; and
   describing the radical-based HMM with a finite state machine that comprises at least one state selected from durative states or turning states, wherein a durative state represents a stroke forming action in forming the character.

7. A method for character recognition, implemented at least in part by a computing device, the method comprising:
   receiving ink data for a character;
   recognizing the character as associated with the received ink data using a radical-based Hidden Markov Model (HMM), the radical-based HMM comprising radical nodes, wherein a radical node represents a structural element of the character, and connection nodes, wherein a connection node represents a spatial relationship between two or more radicals; and
   describing the radical-based HMM with a finite state machine that comprises at least one state selected from durative states or turning states, wherein a turning state represents a turning action in forming a character.

8. A method for training a radical-based Hidden Markov Model (HMM) for character recognition, implemented at least in part by a computing device, the method comprising:
   providing an initial radical-based HMM that comprises radical nodes and connection nodes;
   splitting character ink data into radical data and connection data using the initial radical-based HMM;
   training radical HMMs with the radical data and training connection HMMs with the connection data;
   generating a trained radical-based HMM by concatenating the trained radical HMMs and the trained connection HMMs; and
   determining a number of paths for the trained radical-based HMM, wherein the determining the number of paths for the trained radical-based HMM includes using a subsequence direction histogram vector (SDHV) clustering.

9. The method of claim 8 further comprising iteratively training the radical-based HMM using the character ink data.

10. The method of claim 8 further comprising splitting character ink data into radical data and connection data using the trained radical-based HMM.

11. The method of claim 10 comprising generating a refined trained radical-based HMM using the radical data and the connection data split using the trained radical-based HMM.

12. The method of claim 8 wherein the characters comprise East Asian characters.

13. A method for training a radical-based Hidden Markov Model (HMM) for character recognition, implemented at least in part by a computing device, the method comprising:
   providing an initial radical-based HMM that comprises radical nodes and connection nodes;
   splitting character ink data into radical data and connection data using the initial radical-based HMM;
   training radical HMMs with the radical data and training connection HMMs with the connection data;
   generating a trained radical-based HMM by concatenating the trained radical HMMs and the trained connection HMMs; and
   determining a number of states for the radical-based HMM, wherein the determining the number of states for the radical-based HMM comprises using a curvature scale space-based (CSS) corner detection.

14. A method for training a radical-based Hidden Markov Model (HMM) for character recognition, implemented at least in part by a computing device, the method comprising:
   providing an initial radical-based HMM that comprises radical nodes and connection nodes by:
     selecting a set of characters;
     providing a set of radicals that can represent the characters;
     providing types of connections that represent relationships between two or more radicals of the set of radicals; and
     generating the initial radical-based HMM by constructing paths through nodes that represent radicals and nodes that represent types of connections using a path splitting algorithm that applies a convergence measure, wherein the convergence measure comprises self-rotation probabilities and leaving transition probabilities;
   splitting character ink data into radical data and connection data using the initial radical-based HMM;
   training radical HMMs with the radical data and training connection HMMs with the connection data; and
   generating the trained radical-based HMM by concatenating the trained radical HMMs and the trained connection HMMs.

15. A method for training a radical-based Hidden Markov Model (HMM) for character recognition, implemented at least in part by a computing device, the method comprising:
   providing an initial radical-based HMM that comprises radical nodes and connection nodes by:
     selecting a set of characters;
     providing a set of radicals that can represent the characters;
     providing types of connections that represent relationships between two or more radicals of the set of radicals; and generating the initial radical-based HMM by constructing paths through nodes that represent radicals and nodes that represent types of connections using a path splitting algorithm that applies a convergence measure;

splitting character ink data into radical data and connection data using the initial radical-based HMM;

training radical HMMs with the radical data and training connection HMMs with the connection data; and generating the trained radical-based HMM by concatenating the trained radical HMMs and the trained connection HMMs.

* * * * *